C. S. LABOFISH.
BRUSH MACHINE.
APPLICATION FILED JAN. 18, 1911.
1,190,302.
Patented July 11, 1916.
11 SHEETS—SHEET 2.
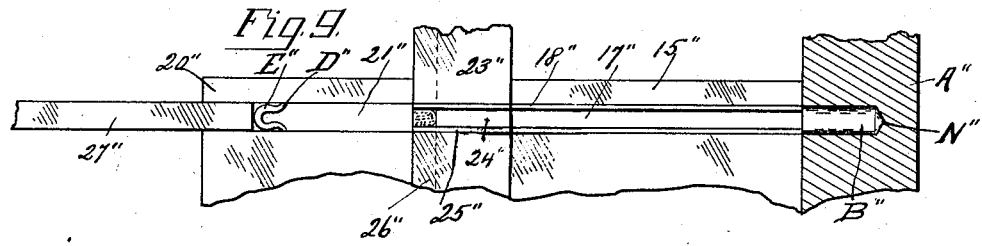
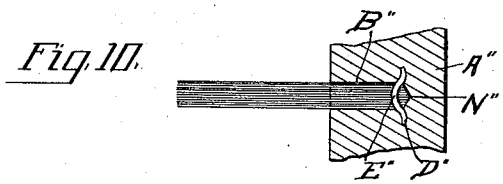
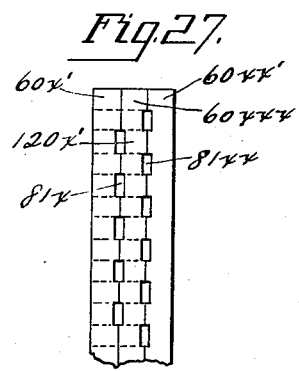
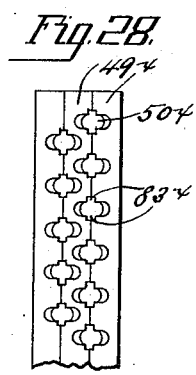
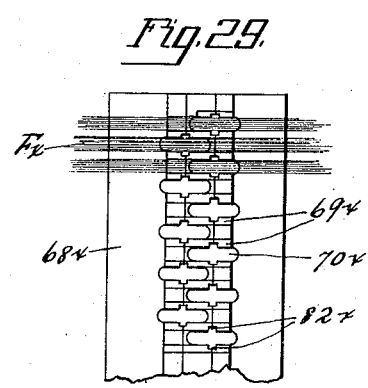
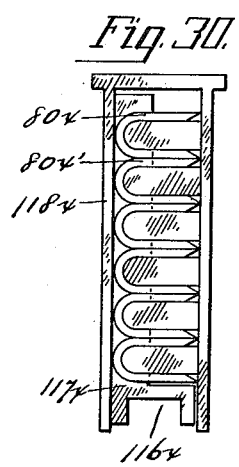
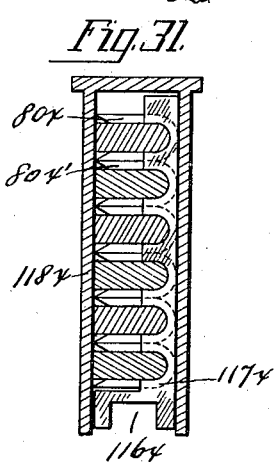
Witnesses
Inventor
Chas. S. Labofish

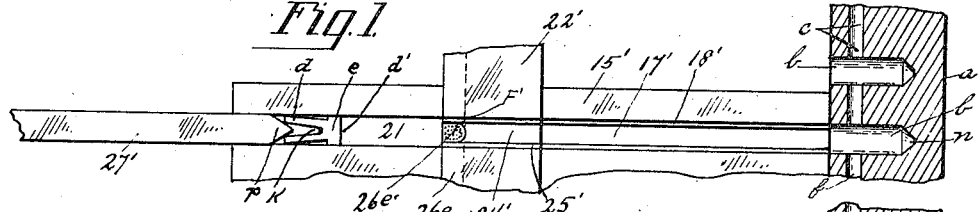
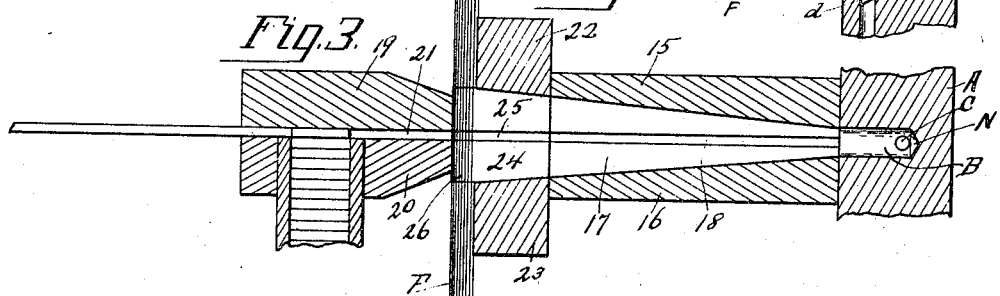
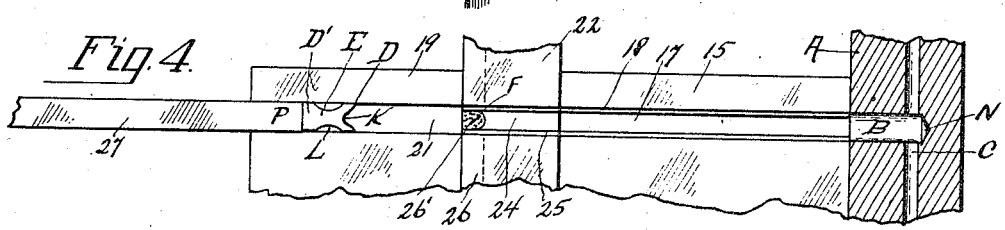
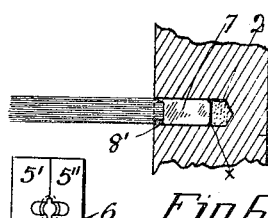
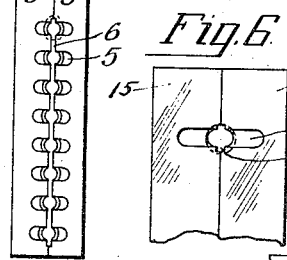
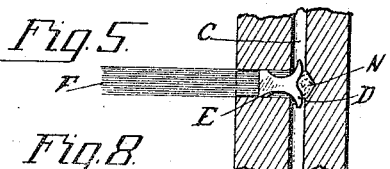
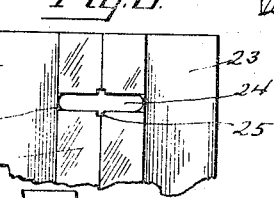
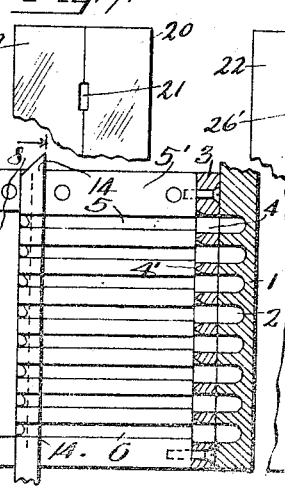

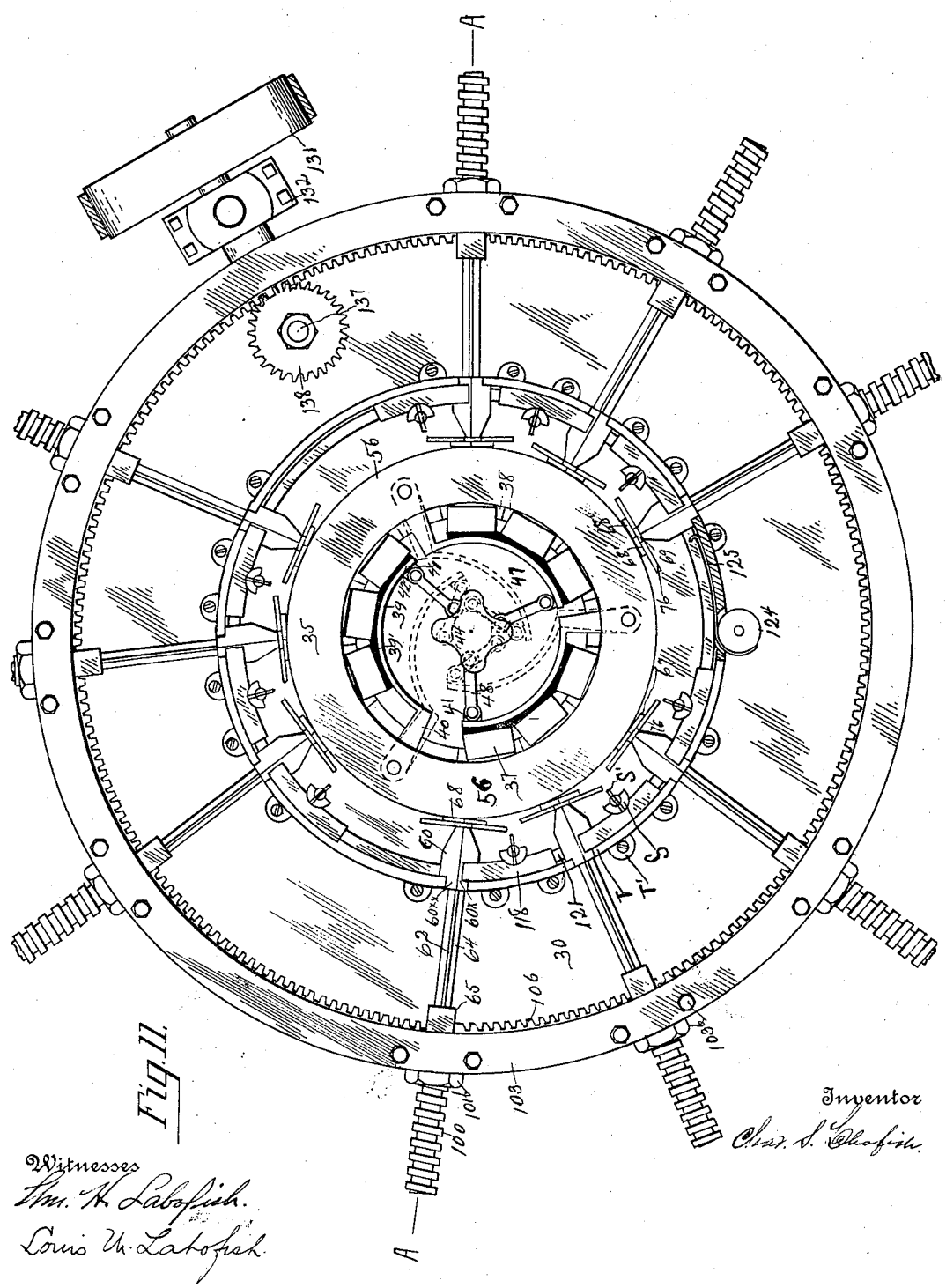

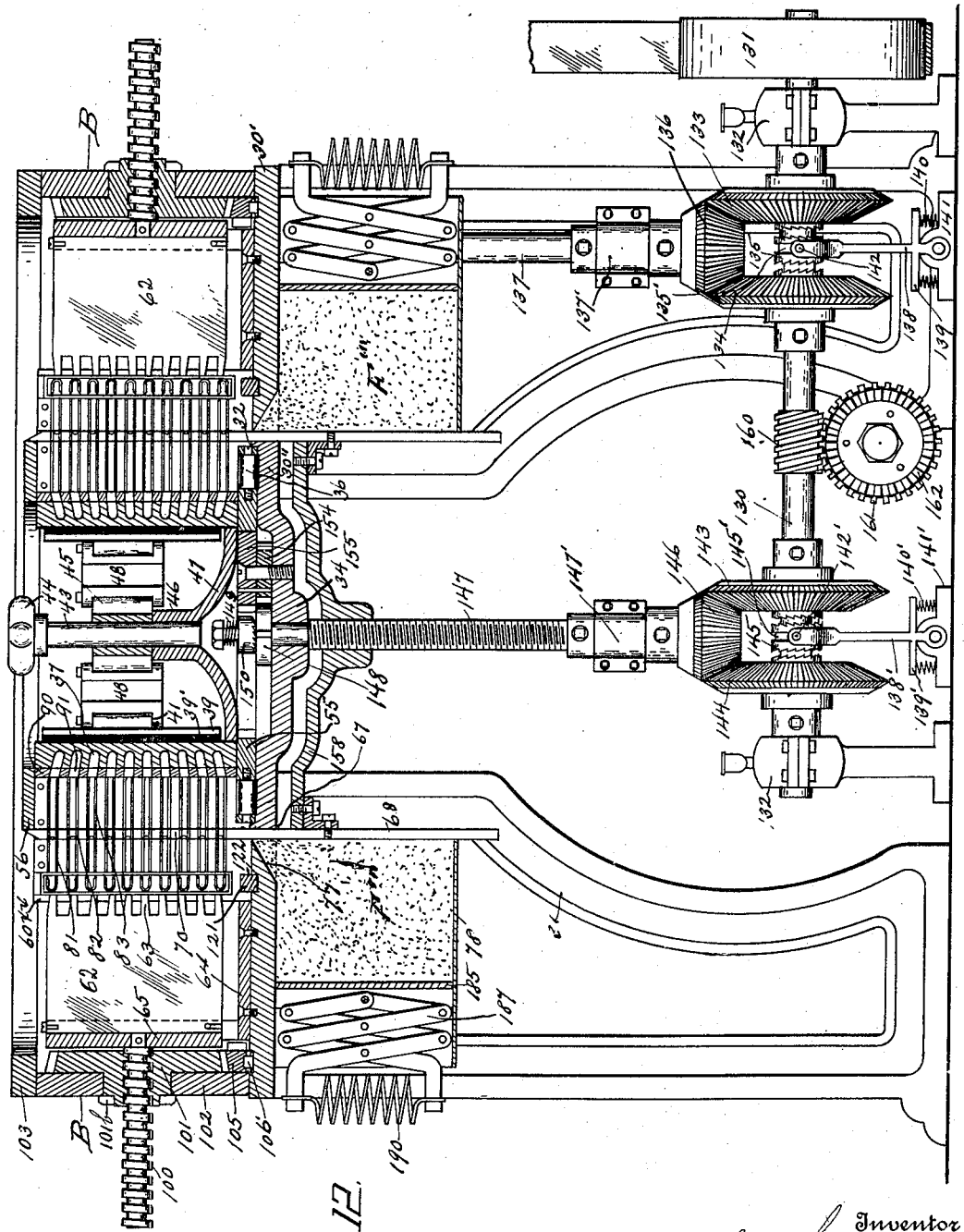

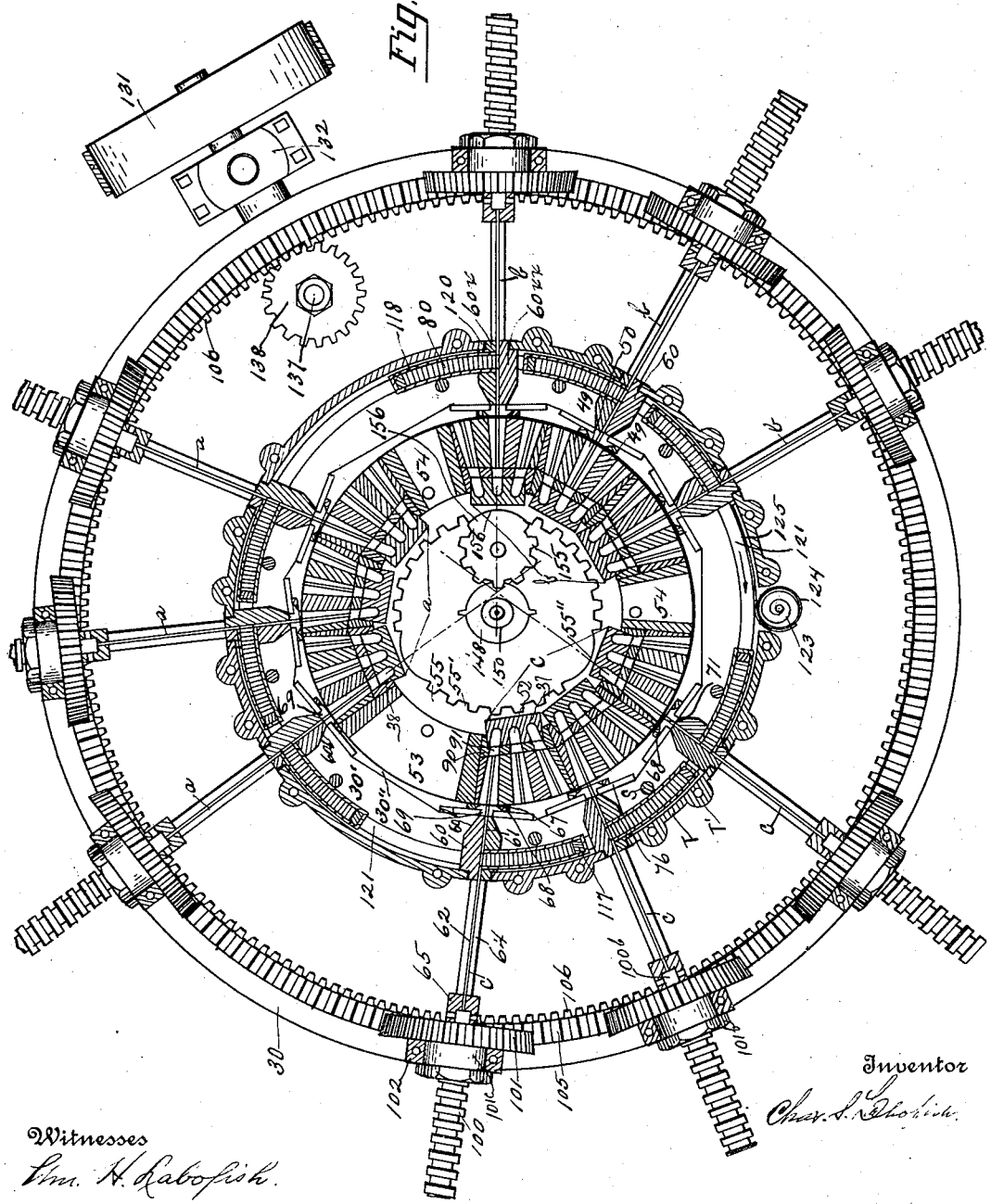

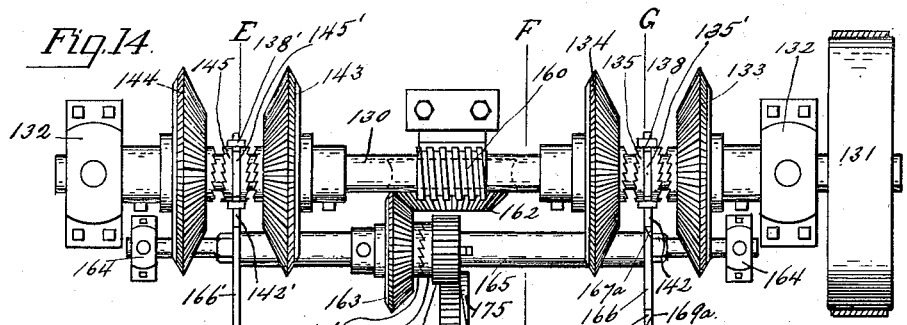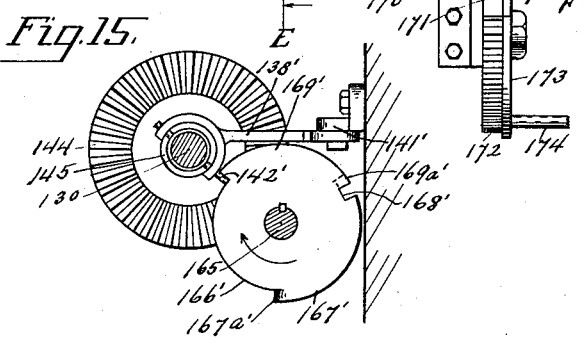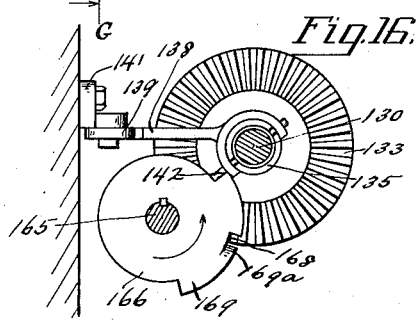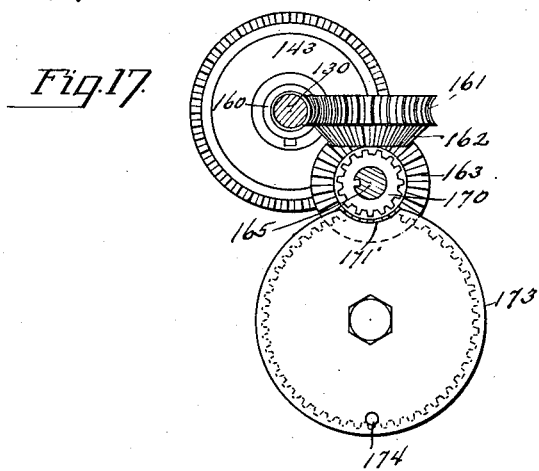

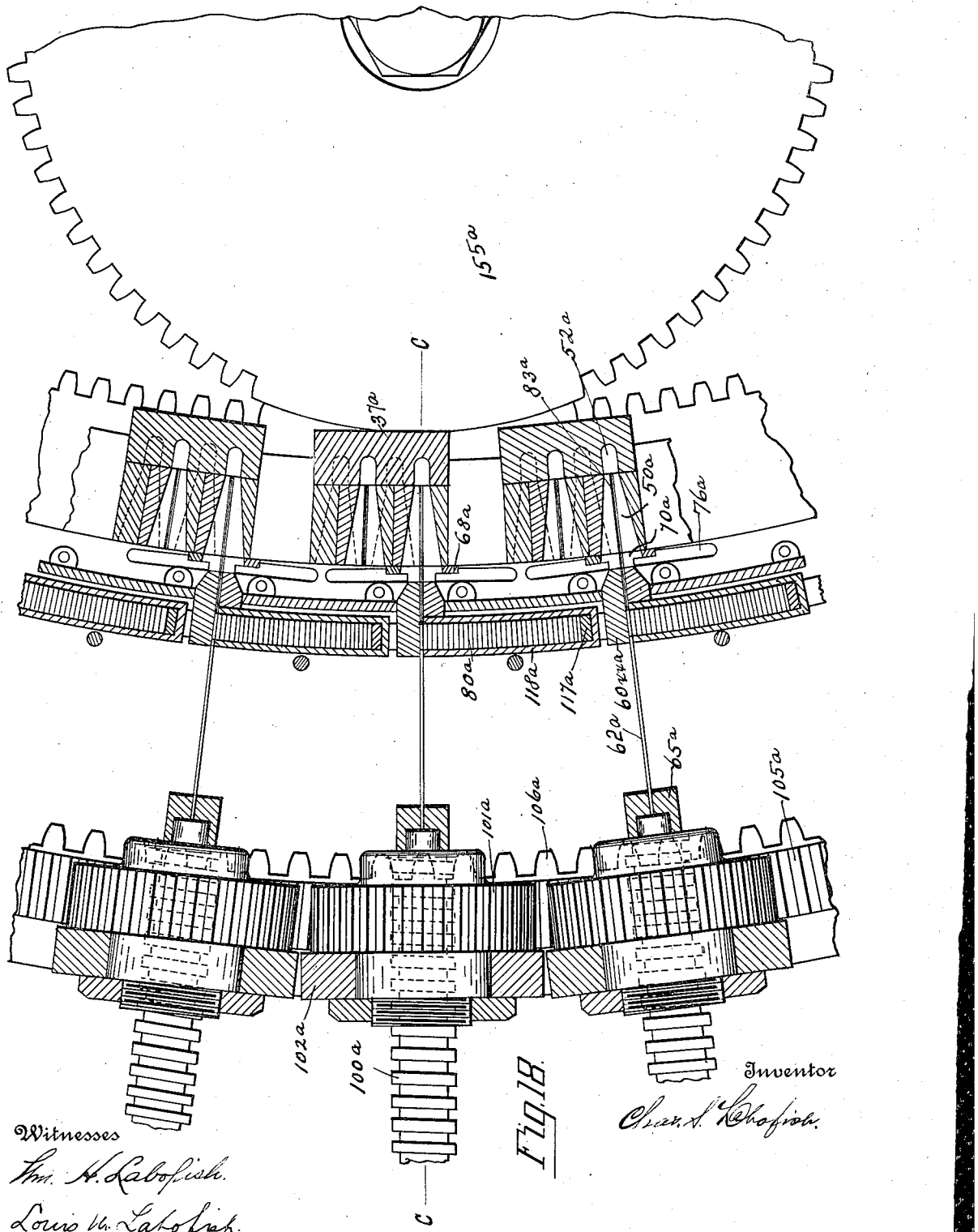

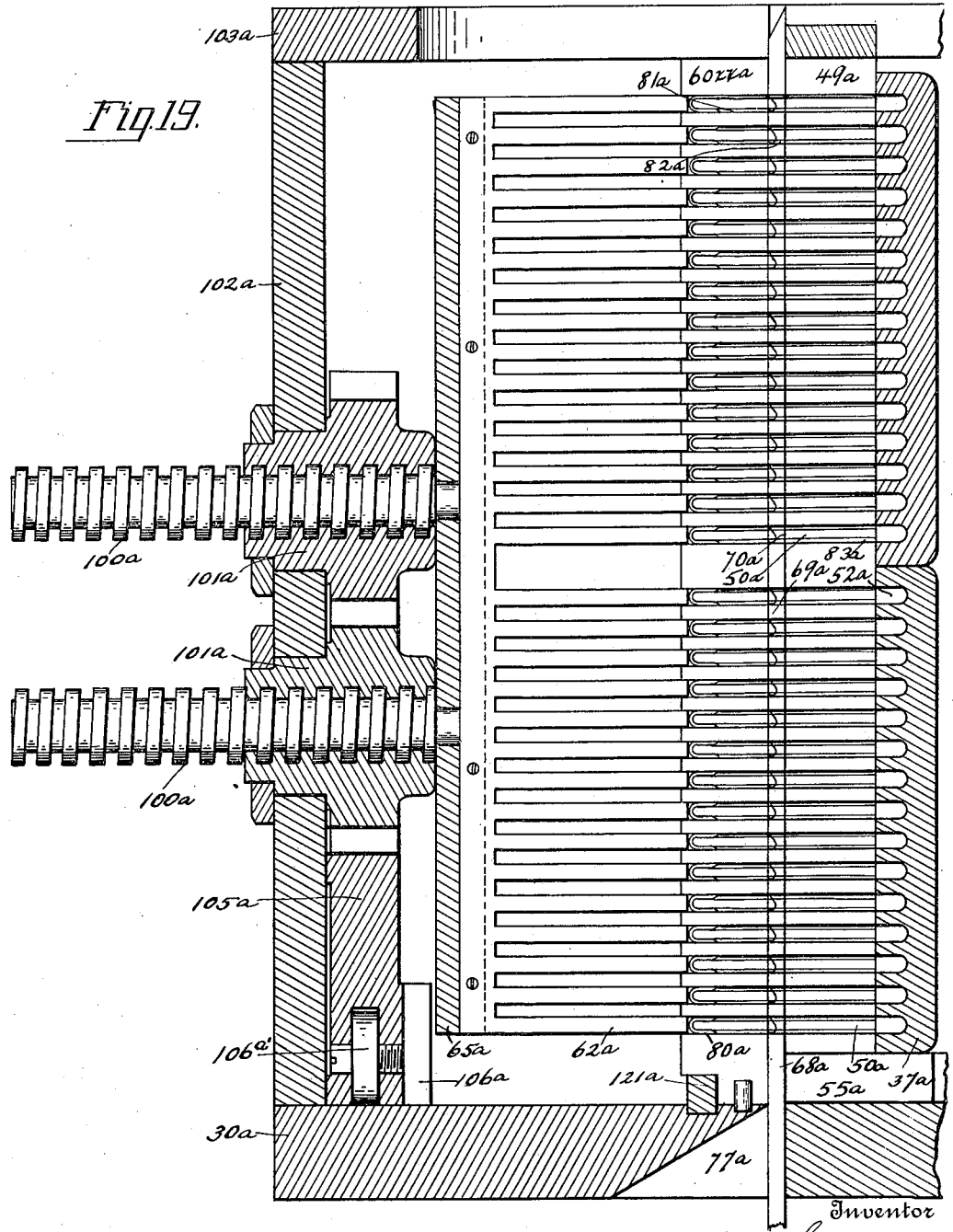

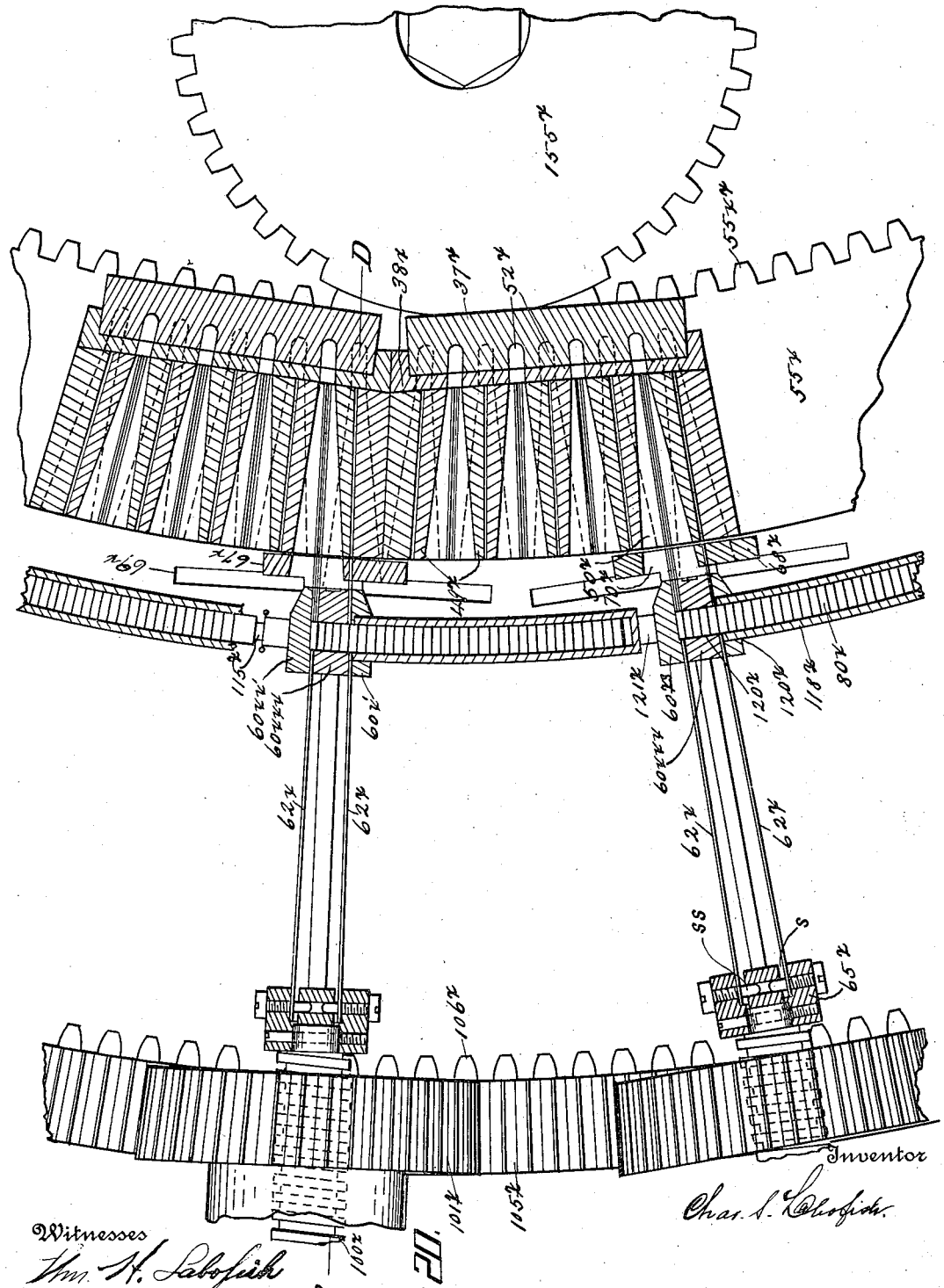

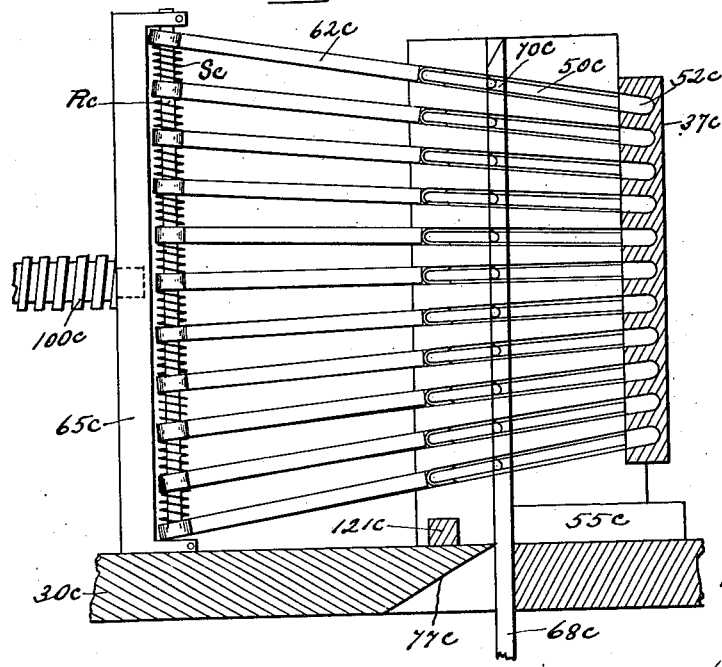
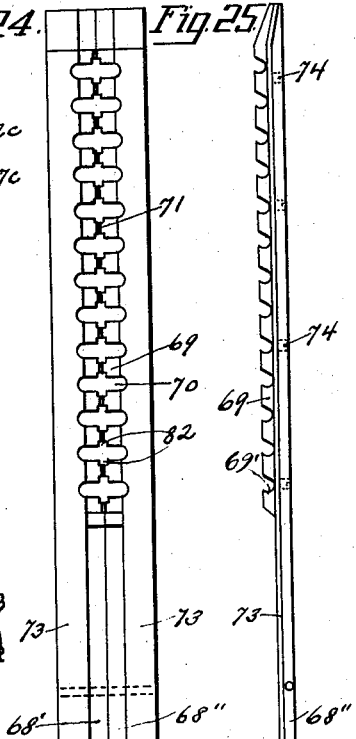
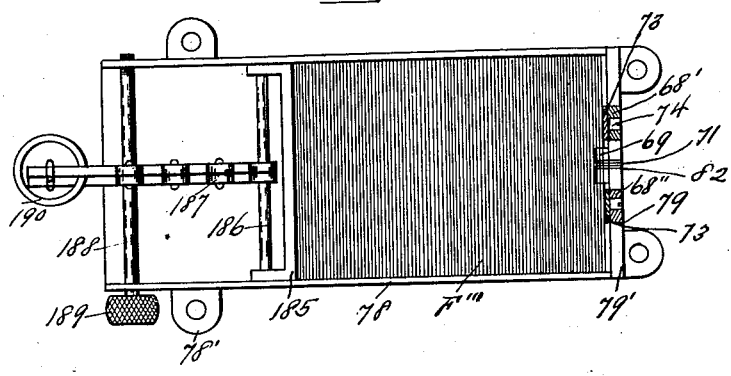

UNITED STATES PATENT OFFICE.

CHARLES S. LABOFISH, OF WASHINGTON, DISTRICT OF COLUMBIA.

BRUSH-MACHINE.

1,190,302.  Specification of Letters Patent.  Patented July 11, 1916.

Application filed January 18, 1911. Serial No. 603,372.

*To all whom it may concern:*

Be it known that I, CHARLES S. LABOFISH, a citizen of the United States, residing at Washington, in the District of Columbia, have invented certain new and useful Improvements in Brush-Machines, of which the following is a specification.

The invention herein enunciated relates to improvements in brush making machines and comprises certain new and useful improvements on the machines shown and described in my applications dated Dec. 18, 1905; Sept. 3, 1907; and Oct. 8, 1909, bearing Serial Nos. 292,318; 391,068; and 521,725 respectively.

The objects of the present improvements are: first, to provide the cells in hard-substance brush blanks with means for engagement with expansible knot fasteners; second, to provide means for gathering a row of separated tufts of filaments and interposing the same between tuft-doubling-and-inserting devices; third, to provide means for simultaneously feeding knot fasteners to a plurality of tuft-doubling-and-inserting devices; fourth, to provide for splaying the knots in the brush without rocking the brush blank; fifth, to provide means for automatically controlling the motion-reversing means of one or more driving mechanisms so as to enable the machine to carry on successive operations without the aid of the operator; and, sixth, to provide for feeding knot fasteners to a plurality of rows of tuft inserters from a single source. I attain these objects by the mechanisms, means, and devices illustrated in the accompanying drawings, in which—

Figure 21:
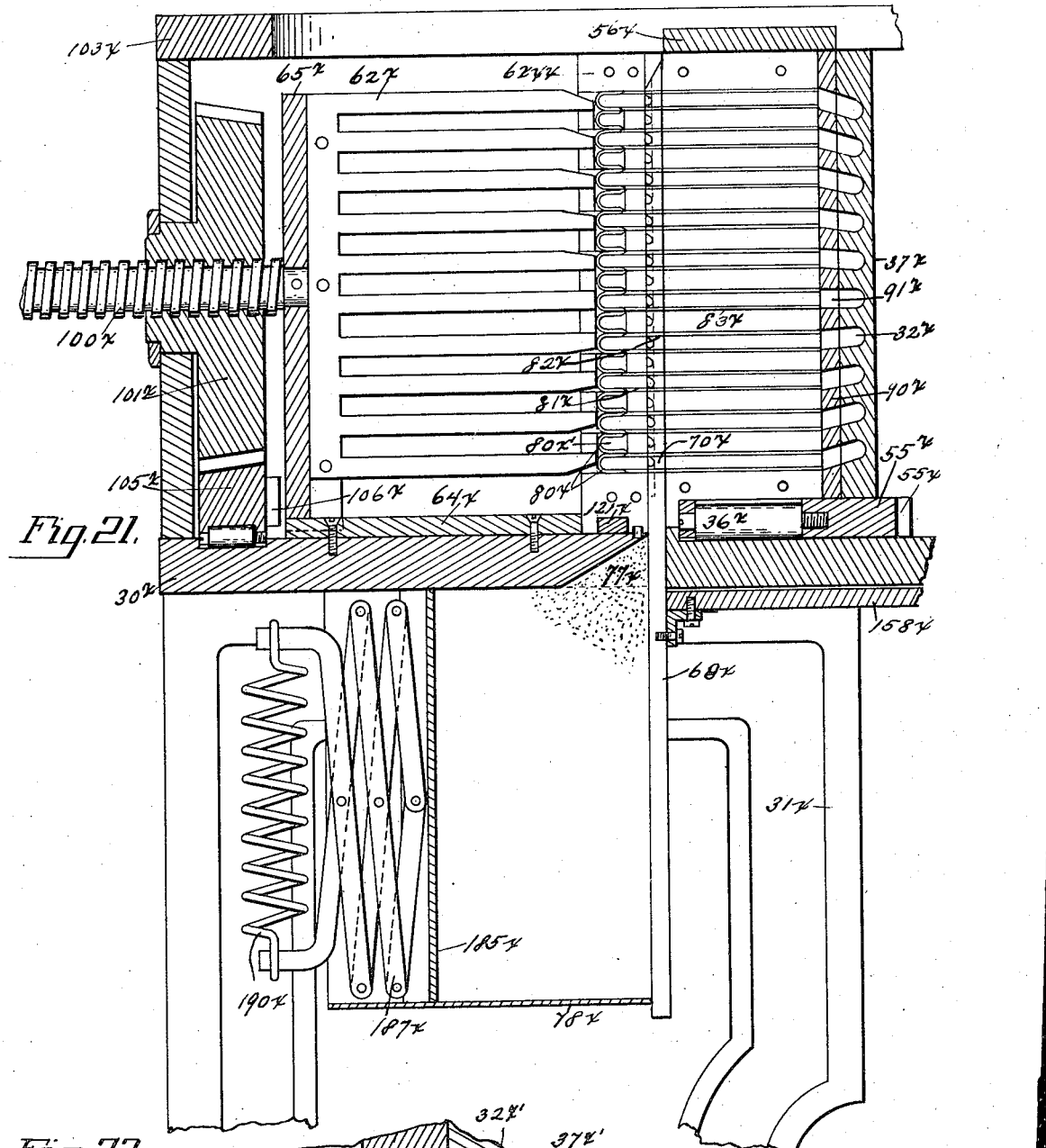
Figure 22:
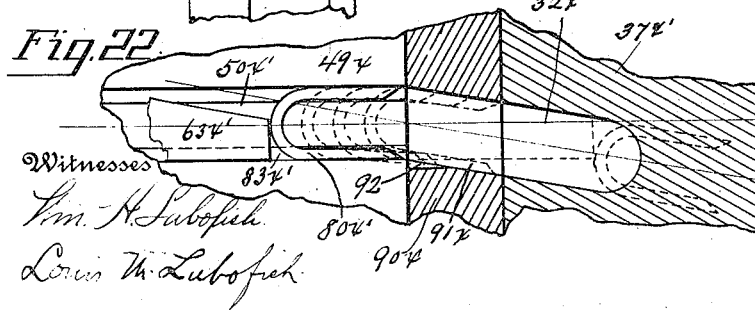

Figure 1 is an enlarged view of parts containing a longitudinal-half of a single-tuft doubling-and-inserting mechanism. Fig. 2, a section of a piece of a hard-substance brush blank containing a knot anchored by the kind of knot fastener shown in Fig. 1. Fig. 3 a section of a full tuft-doubling-and-inserting mechanism of the kind shown in Fig. 1. Fig. 4, a view similar to Fig. 1 containing my improved sheet-material knot fastener. Fig. 5, a view similar to Fig. 2 containing a knot anchored by the kind of fastener shown in Fig. 4. Fig. 4$^A$, a modification in the construction of the knot fastener, and in the means for conveying such fasteners in row-tufting mechanisms. Fig. 4$^B$, a face view of the member containing the row of conduits shown in Fig. 4$^A$. Fig. 4$^C$, a face view of a piece of a plate entering the construction shown in Fig. 4$^A$. Fig. 4$^D$, a view similar to Fig. 5 containing a knot anchored by one of the fasteners shown in Fig. 4$^A$. Figs. 6, 7, and 8 are detail views of parts shown in Fig. 3. Fig. 9 is a view similar to Fig. 4 containing a modification of the expansible knot fastener seen in Fig. 4. Fig. 10, a view similar to Fig. 5 with the knot anchored by the fastener seen in Fig. 9. Fig. 11, a reduced top-plan view of a multiple brush machine embodying improvements of the present invention. Fig. 12, a vertical section taken on the line A—A of Fig. 11. Fig. 13, a horizontal section taken on the line B—B of Fig. 12. In Figs. 12 and 13 certain parts are omitted to show others to better advantage. Fig. 14, a top-plan view of the actuating mechanism part of which is shown in Fig. 12. Fig. 15, a section taken on the line E—E; Fig. 16, on the line F—F; and Fig. 17, on the line G—G of Fig. 14. Fig. 18, an enlarged view of a segmental part of a brush machine partly in horizontal section, showing a modification in the disposition of some of the parts shown in Fig. 13. Fig. 19, the upper part of a vertical section taken on the line C—C of Fig. 18. Fig. 20, a view similar to Fig. 18 containing some further modification in the disposition of parts. Fig. 21, a reduced, incomplete, vertical section taken on the line D—D of Fig. 20. Fig. 22, an enlarged broken out piece of the upper end of Fig. 21. Fig. 23, a modification of the knot-splaying means shown in Fig. 12. Figs. 24 and 25 are detail views of the tuft gatherer shown in Figs. 12 and 13. Fig. 26 is a top-plan view of a filament receptacle shown in Fig. 12. Figs. 27, 28, and 29 are detail views of parts entering the construction of the machine shown in Figs. 20 and 21. Figs. 30 and 31, detail views of the knot-fastener containing receptacle shown in Fig. 20.

Similar characters of reference denote corresponding parts throughout the several views.

Some of the new and useful features of invention herein shown and described are capable of being used in single-tuft inserting machines, others in single row-tuft-inserting machines, and still others are capable of being used in other relations, for effecting the same purposes in machines other than brush making machines. The fact that said features are shown and described as applied to multi-serial brush making machines, I wish to have it clearly understood, shall not operate to limit them thereto.

The approved substance of which tooth brush handles are made is bone. The texture of bone is so dense and hard that it is impossible to force the limbs of expansible sheet-material knot fasteners, such as shown in the patent to Gane No. 378,130, into the walls of the cells in bone brush blanks. Hence, the use of expansible sheet-material knot fasteners is, to my knowledge, at the present limited to impressible-substance brush blanks, such as wood or celluloid.

To enable the brush maker to use expansible sheet-material knot fasteners in bone brush blanks, each of the cells $b$ in the bone brush blank $a$ is provided with means for engagement, preferably oppositely disposed cavities $c$ for the corners of the limbs $d$ of the expansible sheet-material knot fastener $e$ to engage in the manner shown in Fig. 2. The cavities $c$ can be readily made by merely drilling a longitudinal hole $f$ so as to perforate the partitions $g$ between the cells in the row, as shown in Fig. 1.

Expansible sheet-material knot fasteners constructed in the manner shown in the patent to Gane mentioned, and herein marked $e$ in Fig. 1, are, however, open to very serious objections. Owing to the kerf $k$ in said fastener and the necessarily pointed end $p$ of the plunger bearing against the inner corners of the yielding limbs $d$ when driving the bight of the knot with the plain end $d'$ of the fastener into the cell in the brush blank, it is extremely difficult, if not impossible, to force the bight of an ample knot into the cell; as the excessive pressure exerted on the yielding limbs $d$ would spread them and in some constructions of knot-conveying means wedge them in the nozzle, and thus create excessive friction, and in others spread the limbs of the fastener to such an extent as to prevent its entrance into the cell.

To enable the brush maker to force the bights of ample knots into cells in hard-substance brush blanks and anchor the knots in the cells by means of expansible sheet-material knot fasteners, I construct the knot fastener as shown in Fig. 4.

The edge of the end $D'$ of the knot fastener E is plain, that of the opposite end, and the edges of the sides in proximity thereto, are cut out so as to form short, rounded limbs D relieved at L so that when the fastener is forced against a hard surface or the bottom of the cell B in hard-substance brush blanks said limbs will tend to curl laterally outward and thus spread out and enter the oppositely disposed cavities C therein, as shown in Fig. 5. The end $D'$ being plain, the forcing of the amplest knot with this fastener can in nowise expand it at any point in its travel to the cell, nor at any inappropriate point in the cell until the limbs D strike the bottom of the cell.

My tuft-doubling-and-inserting mechanism, constructed for anchoring the knots in the cells by means of individual knot fasteners, is provided with suitable means for holding the brush blank A, having the cell B therein, in contact with a member containing a tuft-conveying opening, or conduit, and a knot-fastener-conveying channel. The said conduit and channel are so constructed that their imaginary lines crossing at one of the orifices of said conduit will register with the diameter of the said cell, to the end that the bight of the knot and the width of the fastener be of the precise diameter of the cell, instead of somewhat smaller as heretofore, and thus enable the insertion of an ample knot and a close fitting fastener.

To facilitate the forming of said conduit and channel, the said member is composed of conjoined parts 15 and 16. The conduit 17 is made broad at the orifice opposite said cell and courses tapering widthwise to the cell B, in order that an ample tuft of filaments be readily doubled and easily conducted to the cell B and the bight of the knot tightly compressed at the point of transition from the conduit into the cell to the diameter of the cell and entered thereinto without cutting or abrading of the filaments against the sharp edges of the orifice of the cell in hard-substance brush blanks, or split a bone brush handle along the row of cells.

Grooves 18, disposed opposite each other, are made in the parallel walls of said conduit, and, to the end hereinbefore specified said conduit and grooves are of such dimensions as that the distance between the opposite walls of the conduit at its smaller orifice and the distance between the opposite walls of the grooves 18 register with the diameter of the cell, as clearly shown in Figs. 3 and 4 and indicated by the dotted circle in Fig. 6. Opposite said knot-conveying, or conduit-containing, member is a plunger-and-knot-fastener-guiding member, preferably similarly composed of conjoined parts 19, 20, having an elongated opening 21— Fig. 7—of the width and height of the oppositely disposed grooves 18 and held so that said opening 21 registers with said grooves 18, as clearly shown in Figs. 3 and 4. Interposed between said two members, and in close contact with the plunger-and-knot-fastener-guiding member, is a movable tuft holder, which to facilitate the manufacture thereof is composed of conjoined bars 22, 23, preferably provided with a rib 26 along the line of juncture of said bars for the purpose hereinafter specified and having an opening 24 and oppositely disposed grooves 25, therein which when in the position shown in Figs. 3 and 4 extend between the grooves 18 and opening 21, and a space 26′ forming notches in the edges of said rim along the space between the said grooves 25—Fig. 8. In said opening 21 is guided a plunger 27 and a suitable knot-fastener, introduced thereinto through the opening in the part 20 preferably by the means hereinafter described. In the space 26′ of said tuft holder is held a tuft of filaments F. By this means the tuft F of requisite thickness is boxed in between the space 26′ and the face of the member composed of parts 19 and 20, and overlies the opening 24 without interrupting the continuity of the composite knot-fastener conveying channel 21, 25, 18, as shown in Figs. 3 and 4. Upon forcing the plunger 27 against the knot fastener E, the latter doubles the tuft F and forces its bight into the cell B in the brush blank A. Upon exerting further pressure on the fastener E, the outwardly-rounded ends D spread out and enter the previously made cavities C, in the hard substance blank B, as shown in Fig. 5.

In certain kinds of brushes the blanks are too soft for expansible sheet-metal knot fasteners and too thin for staples. In such brushes I prefer to use the expansible knot fastener E′ shown in Fig. 9. This fastener is made of suitable wire in the shape of a short staple with the limbs D″ curved outwardly so as to favor partial straightening out of the loop upon being forced against the bottom of the cell and thus project the limbs D″ into the wall of the cell in the manner shown in Fig. 10.

In all the brush machines thus far patented I have knowledge of, the conduit, usually termed "nozzle", is somewhat smaller than the cell in order to be able to center it therein. As clearly shown in Figs. 3, 4, and 6, the major axis of the smaller orifice of the conduit 17 and the distance between the opposite walls of the grooves 18 correspond with the diameter of the cell B, while the adit orifice of said conduit and the opening 24 in the tuft carrier are broad. By means of this construction the tuft F is easily doubled and conducted to the point of transition from the conduit into the cell with very little friction, and at the point of transition the bight of the doubled tuft is compressed to the diameter of the cell. In virtue of the construction the tuft is forced into the cell without great friction against the sharp edges of its orifice, which in hard-substance brush blanks tends to cut or abrade the filaments, and in tufting a row of cells at a time in a bone brush blank tends to split the blank along the row of cells; and the tuft fastener may be made of the precise diameter of the cell and so as to enter tightly thereinto.

Fig. 4ᴬ shows a modification, suited for row-tufting mechanisms, by means of which the knot-fastener-conveying-channel described may be dispensed with. The row of conduits 5 is bisected by a fine slot 6—Fig. 4ᴮ—and the knot fasteners 7 are connected by fine shanks 8. Interposed between the brush blank 1 and the member composed of parts 5′, 5″ containing the row of conduits 5 is a plate 3 having holes 4 therein each of which forms a continuation of one of said conduits and registers with one of the cells 2 in the blank 1. The partitions between the holes 4 in the plate 3, at the point of contact with the member containing the conduits 5, are reduced to knife edges 4′—Figs. 4ᴬ and 4ᶜ. In a slot 11, in the guide member 13, is guided a toothed blade 12 into a corresponding slot 14′ in the movable tuft carrier 14 and into said slot 6. Upon moving the blade 12 into said slots in the tuft carrier and conduits, the connected row of knot fasteners 7 double the row of tufts in the tuft carrier 14 and shove them into the holes 4 in the plate 3. Upon exerting further pressure on the connected row of fasteners 7, the knife edges 4′ sever the several shanks 8 and the teeth 12′ of the blade force the thus separated fasteners into the cells, anchoring the knots in the manner shown in Fig. 4ᴰ, with the short stubs 8′ tightly pressed against the walls of the cells by the purposely chamfered off teeth 12′. To guard against the possibility of filaments entering the spaces between the connected fasteners 7, the conduits 5 and the openings in the tuft carrier 14 coincident therewith, are somewhat narrower in height than the holes 4, as shown in Figs. 4ᴬ and 4ᴮ. Any known or unknown construction of knot fastener for anchoring the knots in any kind of brushes may be similarly connected in a row and separated at the cells in the brush blank by any means deemed appropriate.

In Figs. 11, 12, and 13 I have illustrated the further improvements of the present invention embodied in a multi-serial multiple-brush machine which by preference is constructed on the lines of the machines shown and described in the applications previously mentioned. In constructing this machine, a table 30, preferably circular in its contour, is suitably mounted upon legs 31 extending radially toward, and close to, the center of the table so as to support the weight thereon and also to serve as guide members for a vertically-movable disk described hereinafter. In the center of said table, preferably in a recess 32 therein, is held rotatably an annular brush-blank-carrier 35, preferably mounted upon anti-friction rollers 36, carrying a plurality of brush-blanks 37, arranged circularly therein, each of which is suitably stayed vertically, preferably by ribs 38, and suitably held in close contact with the wall of the annular member, preferably by radially expansible means. The latter may be of any suitable construction, but is preferably composed of a plurality of segmental shoes 39, preferably faced with some yielding material 39′, each of which is suitably hinged at one of its ends 40 in the carrier 35 and provided with a lug 41 at its opposite end 42; a rod 43, provided preferably with a knob 44, whereby it is turned by hand, and lugs 45, is held rotatably in the boss 46 on the bottom 47 of the carrier 35, and links 48 each of which connects one of said lugs 41 to a lug 45 on said rod—Fig. 12. By turning the knob 43 in one direction the several shoes 39 simultaneously expand and press on the backs of the blanks 37, and by turning the rod 43 in the opposite direction the several ends 42 of the shoes are simultaneously drawn toward the rod 43 and the brushes 37 thereby released, as clearly shown, and indicated by dotted lines, in Fig. 11.

In the blank carrier 35 are rows of suitable tuft-conveying channels, or conduits, 50 corresponding in number to the cells 52 in the brush blanks 37 and arranged so that each conduit leads to a cell in a brush blank. Every cell in the brush blank being thus provided with a conduit independent of the others, the relation between the cells and the tuft conveyers is automatically maintained and perfect symmetry of knots in each row and of the rows of knots in each brush is assured. To facilitate the forming of the said conduits 50 in the carrier 35 tapering widthwise, that they compact the bight of the doubled tuft at the point of transition, the carrier is composed of plates 49, in the surfaces of each contiguous pair of which said conduits are formed, and blocks 53 and 54, all of which are suitably held together by means of rings 55, 56 so as to form an integral body, as clearly shown in Figs. 11, 12, and 13. The brush blanks 37, and the plates 49 containing the conduits 50 leading to the cells 52 in the said blanks, are, for the purpose hereinafter specified, arranged in groups—three, in the present illustration—marked respectively a, b, and c, as clearly shown in Figs. 11 and 13.

In juxtaposition to the carrier 35, are held, rigidly secured to the table 30 and suitably stayed vertically, guide blocks 60, corresponding in number to the brush blanks in the groups a, b, and c, for guiding suitable tuft inserters into the conduits 50 and cells 52, opposite thereto. To conduce to rigidity of the tuft inserters and economy in the cost of making and mounting the same, said tuft inserters are preferably, wherever deemed feasible, formed in the shape of blades 62 each of which has a series of suitably shaped teeth 63, and each blade is held slidably in a slot 61 in said block 60 so as to be guided thereby into the slot which bisects the row of conduits 50 opposite thereto, as clearly shown in Figs. 12 and 13. The opposite end of each blade 62 is held in a bar 65, preferably additionally guided and preferably by straddling a rib 64 rigidly secured to the table 30 in alinement with the slot 61 in the block 60—Figs. 11 and 12.

Interposed between each block 60 and the pair of plates 49, containing a row of conduits 50, opposite thereto is held, slidable vertically, in a seat 67 made in the table 30, a tuft gatherer 68 in close contact with the block 60. Said tuft gatherer, to facilitate its manufacture, is composed of two bars 68′, 68″ and has a plurality of teeth 69 raised upon the bars at their juncture and openings or conduits 70 in the spaces between said teeth corresponding in number to, and registering in spacing with, the conduits 50. Said openings 70 being, in the present illustration, similarly bisected by a slot 71 coincident with the slot 51 bisecting said conduits and the slot 61 in the block 60, for the purpose of admitting a blade tuft inserter, when one is used, as clearly shown in Figs. 12 and 13.

Between each block 60 and tuft gatherer 68 is a slot 76 in the table 30, preferably beveled off at 77 from the underside of said table toward the tuft gatherer 68 for the filaments to tend to crowd themselves into the space and also for the purpose of bringing the filaments closer to the block 60 thereover. To facilitate the forming of said slots 76 and seats 67, said table is preferably composed of two parts 30′ and 30″, as clearly shown in Figs. 12 and 13. A suitable receptacle 78 containing filaments F‴ for the tufts and suitable means for urging the filaments toward said tuft gatherer is suitably held to the underside of said table, so that the teeth 69 of said tuft gatherer jut out into the mass of filaments F‴ in the receptacle 78, as clearly shown in Fig. 12.

Upon moving the tuft gatherer 68 upward, into the position seen in Fig. 12, the teeth 69 gather filaments in the spaces between and thus form uniform tufts of filaments of the size of the spaces between each adjacent pair of teeth 69, so that when said tuft gatherer is in the position shown in Fig. 12 a separate tuft of the filaments F‴ is interposed between each tuft inserter, or tooth 63, and the conduit 50 opposite thereto; and upon forcing the tuft inserters into the openings 70 the tips, or teeth, 63 double the several tufts of the filaments F‴ and thrust their bights into the cells 52 through the openings 70 in the tuft gatherer 68 and the conduits 50.

To enable the teeth 69 to gather compact tufts of the filaments F‴ of uniform size, said teeth are undercut at 69′—Fig. 25—so that in the upward movement of the gatherer 68 the teeth 69 will load and pack the filaments in the spaces between each pair of teeth. To enable the operator to regulate the thickness of the tufts in the row, preferably strips 73 of springy material are secured to the lower ends of the bars 68', 68'' on each side of the teeth 69—Figs. 24, 25—which by means of screws 74 in said bars are forced forward, that the cross area of the space between each pair of adjacent teeth 69 and the face of the block 60 may be decreased.

To hold the tufts in the row clenched against slipping laterally and to prevent filaments from entering the space between the surfaces of the teeth 69 and the face of the block 60, which becomes of consequence when toothed blades are used in place of individual plungers, the tuft gatherer 68 is held movably in close contact with the block 60. And to be able to form the uninterrupted, composite, knot-fastener-conveying channel to be presently described, said tuft gatherer is held in close proximity to the plates 49 as well as to the block 60 opposite thereto, as shown in Figs. 12 and 13.

The bights of the double tufts, or the knots, may be anchored, or fastened, in the cells in the brush blank by any means deemed feasible. To be able to anchor the knots in the cells by means of individual fasteners, grooves 81 are formed in the blocks 60, corresponding grooves 82 in the openings 70, and corresponding grooves 83 in the conduits 50. Said grooves register with one another and their orifices abut one another so as to form a series of uninterrupted guide channels for each fastener 80 to travel from its initial point to the cell in the brush blank, unimpeded by any nicks or openings in the path as clearly shown in Figs. 12 and 13.

Some of the brushes now in vogue have the knots set at right angle to the surface of the brush blank, others have the knots set gradually inclining from the middle of the length of the brush blank toward its ends, and still others have the knots splayed both longitudinally and transversely of the brush blank. As clearly shown in Figs. 18 and 19, in its ordinary construction the full size multiple-brush machine arranged as shown and described sets the knots at right angles to the surface of the blank longitudinally and practically so transversely. The present invention provides means for splaying the knots from the middle of the length of the brush blank toward its ends and from the middle row toward the sides of the brush. The complete machine—Figs. 11, 12, and 13—is accordingly herein shown as it is constructed for row-splayed brushes.

For knot splayed brushes the cells 52 are bored so as to incline gradually from the middle of the length of the brush blank toward its ends, as shown in Figs. 12 and 21, and also from the middle of the width of the brush toward its sides, Figs. 13 and 20. In most of the brush machines now in use the brush blank, or stock, is repeatedly rocked by hand so as to bring each individual angular cell successively in line with the tuft inserters; in others, particularly in row-tuft-inserting machines, the blank is rocked so as to bring the entire row in line with the inserters, but only in one direction. The present invention provides for splaying the knots automatically both longitudinally and transversely of the brush without rocking the brush blank.

To direct the bights of the doubled tufts and their fasteners into angular cells bored so as to incline longitudinally of the blank, the conduits $50^c$ may be milled at corresponding angles and individual plungers $62^c$ held movable vertically on a rod $R^c$ preferably against the tension of the springs $S^c$, as shown in Fig. 23. To economize in the height of the machine and in the expense of building the same, I prefer to carry out this part of my invention in the manner shown in Figs. 12 and 21; in which the conduits 50 are formed parallel to each other and a plate 90 having holes 91, each of which is drilled at such an angle as to register with both the cell 52 and the conduit 50, is interposed between the plates 49 and the brush blank 37 containing the row of cells 52 opposite thereto. The angular holes 91 thus communicate between the conduits 50 and the cells 52 and in operation direct the knots and their fasteners into the angular cells, and when the brushes are removed the knots assume the angle of the cells. For long knot fasteners, such as wire staples, some of the conduits 50 and the holes 91 are slightly relieved at 92—see enlarged view Fig. 22, so as to permit the fastener to turn the corner; and the teeth 63, serving as staple drivers, are shaped so as to be able to enter the angular cells and bear on the heads of the knot fasteners, as clearly shown in Figs. 12 and 21. The cells 52 are also bored at an angle to the face of the blank 37 in respect to its width. To effect the setting of the knots at angles diverging from the middle line of the width of the brush blank is, in a circular machine, readily accomplished by arranging the brush blanks in a smaller circle. It is, however, desirable to operate on as large a number of brush blanks simultaneously as possible in order to reduce the cost of labor. As may be seen by reference to Fig. 18, in the full-size machine the divergency of the knots seen in Fig. 13 disappears practically entirely. To effect divergency of the knots from the middle lines toward the sides of the brush, the tuft inserters 62, and the conduits 50 into which they plunge, of the groups $a$ and $c$ (in the present illustration) are arranged so as to course off the radial lines, as indicated by the dot-and-dash lines in Fig. 13. By this means the knots on each side of the middle row are set at an angle to the middle row.

As knot splayed brushes have usually more than three rows of knots and the rows of knots in such brushes are generally staggered, and as the paramount object of the multiple brush machine is to construct and arrange its mechanisms so as to be able to produce a large number of brushes in one continuous operation lasting as little time as possible, I prefer to accomplish the splaying of the knots in such brushes transversely of the brush in the manner shown in Fig. 20. The tuft inserters $62^x$ are arranged in pairs and each pair is held in the bar $65^x$ so as to have slight lateral movement in the space $s$ and the screw ends $ss$. Each adjacent pair of conduits $50^x$, except those in the odd or middle row in the present illustration, is staggered and the openings $70^x$ in the tuft gatherer $68^x$—Figs. 27, 28, 29—and the cells $52^x$ in the brush blanks $37^x$ are correspondingly staggered. The cells $52^x$ are bored at the requisite angles and the conduits $50^x$ and the tuft inserters $62^x$ are in perfect alinement and disposed on lines radiating from the center of the machine. Upon moving the bar $65^x$ toward the block $60^{xs}$ the tuft inserters $62^x$ gradually accommodate themselves to the distance between them in the member $60^{xs}$ and thus set the knots at an angle to the face of the brush blank without being arranged so as to course off the radial lines.

Each of the bars 65 is provided with a screw 100 about in the middle of its length, or two screws for long bars, as shown in Fig. 19, back of the tuft inserter 62. Upon each of said screws is a screw threaded pinion 101 journaled in a wall 102 held rigidly to the table 30 and stayed by a ring 103 thereover. In mesh with said pinions 101 is a circular rack 105, preferably mounted upon anti-friction rollers 106′, and thus upon rotating the circular rack, the pinions 101 drive the several rows of knots and knot fasteners simultaneously into the rows of cells 52 appearing opposite thereto.

To avoid encumbering the machine and impeding rapid operation, the knot fasteners, of the kinds herein shown and described or others, are preferably supplied to the tuft-doubling-and-inserting mechanisms ready made, and interposed between the tufts and the tuft inserters preferably by the following means: Each of the blocks 60 has an opening 120 in one of its conjoined plates $60^x$, or one of the plates reduced in width as shown in Fig. 18 in which rests the end containing the orifice 119 of a receptacle 118 containing in the present illustration rows of knot fasteners so disposed therein that each row is at right angles to one of the composite knot-conveying channels 81, 82, 83, previously mentioned, and in perfect angular alinement therewith, as clearly shown in Fig. 13. By some suitable means preferably of the kind hereinafter described, the knot fasteners in said receptacle are constantly urged to move toward the wall $60^{xx}$, and thus upon withdrawing the blade 62, or the individual plungers $62^x$—Fig. 21,—after inserting a row of knots into the cells, the fasteners bearing against said inserters enter the spaces next adjacent the tips of said fasteners thus vacated by the latter, and by this means a knot fastener is automatically deposited in the path of each inserter.

In a machine provided with twin rows of tuft inserters as $62^x$ in Fig. 20, the guide block $60^{xs}$ therein is composed of three conjoined plates $60^{x'}$, $60^{xx'}$, and a plate $60^{xxx}$ between. In the latter plate are suitable openings $120^x$ through which the alternate knot fasteners $80^{x'}$ reach the second row of tuft inserters $62^x$, as clearly shown in Fig. 21.

In a multiple machine it is necessary to provide means for simultaneously supplying the simultaneously used up knot fasteners. This being a circular machine, I construct said means preferably as follows: A hoop-like ring 121—Fig. 13—is held movable circularly in openings 122 in the lower end of each block 60. Said ring is preferably partly sunk into the table 30, as shown in Fig. 12. Each of said receptacles 118 is provided with a push bar 117 the lower end of which is suitably secured removably in the ring 121, preferably by the bar 117 being provided with a rectangular opening 116 in its lower end, straddling said ring and engaging notches 115 therein—Figs. 20 and 31. Under the influence of a suitable propelling power preferably a spiral spring 123—Fig. 13—held in a barrel 124 and connected to the ring 121 by a flexible band 125, the ring 121 tends to move circularly, in the direction of the arrow, and thus all the push bars 117 in the receptacle 118 simultaneously urge the knot fasteners toward the several walls $60^{xx}$.

The present invention provides means for operating rotary and rectilinear mechanisms having reciprocating movements automatically. To operate the tuft-doubling-and-inserting mechanisms, the tuft gathering and carrying means, and the brush blank carrier, hereinbefore described, automatically, the circular rack 105 is provided, preferably internally, with gear teeth 106 and the ring 55 of the blank carrier 35, is provided internally with gear teeth 55′ and a plurality of cut out arcs 55″, (three, in the present illustration), as clearly shown in Fig. 13.

A motive shaft 130, carrying a pulley 131 and two pairs of bevel gears and a clutch 130 sleeve between each pair, is suitably journaled preferably in floor stands 132—Fig. 12. The bevel gears 133, 134 and 143, 144 are mounted rotatably upon said shaft and the sleeves 135 and 145 are held slidably thereon. In mesh with the gears 133, 134 is a bevel pinion 136 held on one end of a suitably journaled shaft 137. The opposite end of said shaft is held revolubly in a hole through the table 30 and carries a pinion 138 in mesh with the gear teeth 106 of the circular rack 105—Fig. 13. In mesh with the gears 143, 144 is a bevel pinion 146 on one end of a suitably journaled screw threaded shaft 147. The upper end of the latter shaft is held revolubly in a hole through a hub 34 in the center of the underside of a table 30.

As in order to be able to operate on a larger number of brush blanks simultaneously only one row—or one pair of adjacent rows in a machine of the kind shown in Fig. 20—in each brush blank is tufted by the machine at a time, the brush blanks and the tuft inserters are arranged in groups, corresponding in number to the number of double or single rows of cells in the brush blank—in the present instance, three, marked a, b, and c, as previously specified. After the first operation by which one row in each brush blank is tufted in the manner described, the blank carrier 35 is rotated a fraction of a revolution—one-third, in the present illustration of the principles involved—and by this means the next rows of cells in the group of brush blanks a—Fig. 13—are brought into operative relation with the group of tuft inserters b, and the group of blanks b with the group of inserters c, and the group of blanks c with the group of inserters a. After these rows of cells have been tufted the blank carrier 35 is again rotated one-third of a revolution and thereby the remaining rows of empty cells are brought into operative relation with the tuft inserters.

To enable the machine to rotate the blank carrier the requisite fractions of a revolution automatically, the shaft 147 carries on its extreme upper end rotatably thereon a mutilated pinion 148 provided with suitable clutch teeth and slidably thereon a clutch sleeve 150 held in engagement with the mutilated pinion 148 under the influence of a spiral spring 149—Fig. 12. And intermediate the pinion 148 and the internally-toothed ring 55 is journaled a gear wheel 154 conjoined to a mutilated gear wheel 155. The cutouts 55 in said ring and the periphery of the untoothed portion 156 of said mutilated pinion 155 are fitted so that when the latter rests in the former it will detain the blank carrier 35 against movement—Figs. 12 and 13.

On the screw threaded part of the shaft 147 is fitted a vertically movable disk 158 provided with screw threads in its center in mesh with its screw threads. Said disk is suitably guided in the vertical movements imparted by said screw threads against rotation, preferably by radial slots therein (not shown) engaging the inner sides of the legs 31. To the periphery of the disk 158 are held, rigidly secured, the several tuft gatherers 68 so as to be moved vertically by the movements of said disk, as shown in Fig. 12.

Through the medium of the means hereinbefore described, the rotating of the shaft 137 moves the several tuft inserters 62 toward and from the center simultaneously, and the rotating of the shaft 147 moves the disk 158 with the several tuft gatherers 68 carried thereby up or down simultaneously, and simultaneously with either the upward or the downward movement—preferably the latter—of the disk 158 the requisite amount of motion is transmitted from the pinion 148 through the wheels 154, 155 to the blank carrier 35 and the latter is rotated the requisite fraction of a revolution—one-third, in the present illustration, the intermittent gearing described being proportioned and timed to effect the results described.

To render the machine capable of performing the several movements described in proper rotation automatically, the clutch sleeves 135 and 145 are each moved laterally by a spring-actuated Y shipper, which holds the sleeve normally under the influence of its spring or springs out of engagement with either of the bevel gears. On the shaft 130 is mounted a worm 160 in mesh with a worm wheel 161 having conjoined thereto a bevel or miter gear 162, as clearly shown in Fig. 12.

In juxtaposition to the shaft 130, and parallel therewith, is a shaft 165, journaled in suitable floor stands 164, carrying a bevel gear 163 in mesh with the gear 162—Fig. 14. The rotary motion of the shaft 130 is in the present illustration of the principles involved transmitted to the shaft 165 through the medium of the worm and worm wheel described so that the latter shaft shall make but one revolution to a given number of revolutions of the former shaft.

On the shaft 165 are mounted rigidly two mutilated disks each of which has a notch in its greater periphery—Figs. 14, 15, 16. The disk 166 is of such diameter and so situated that the stud 142 in the shipper 138, engaging the circumferential groove 135', lies in the path of its extended or greater peripheral portions 167, 169, and has the radial edges 167ª, 169ª beveled off in opposite directions, as shown in Figs. 14 and 16. And the disk 166' is of similar diameter and similarly situated and is of similar construction, except that, in the present illustration, the arc of its greater periphery is larger than that of the disk 166 because of the difference of the movements of the inserters 62 and the tuft gatherers 68, as clearly shown in Figs. 15 and 16. As the shaft 165 begins to rotate, the radially beveled off edge 167ª gradually forces the shipper 138 rightward and thereby drives the sleeve 135 into engagement with the bevel gear 133. The shaft 137 then rotates in the direction for simultaneously moving the several tuft inserters toward the center through the medium of the means previously described, and continues to rotate until the space 168 arrives to the stud 142, which takes place when the bights of the knots are properly seated in the cells. At the instant the bights of the knots touch the bottom of the cells in the brush blanks, the stud 142 jumps off the portion 167 into the space 168, and under the influence of the spring 140 at the right the shipper 138 returns the sleeve 135 to its normal position and thus the movement of the shaft 137 ceases. As the shaft 165 still rotates, the bevel 169ª next forces the shipper leftward and the shaft 137 rotates in the opposite direction and thereby moving the several inserters 62 from the center. As the portion of the greater periphery of the disk 166 passes the stud 142 in the shipper 138, the latter returns the sleeve 135 to its normal position, and throughout the remaining portion of the revolution of the shaft 165 the shaft 137 remains at rest. Immediately after the last operation, the disk 166' begins to act on the stud 142' in the same manner, so that the rotation of the shaft 165 the remaining part of its complete revolution moves the disk 158 the requisite distance up and down to its normal position. The portions 167, 169 and 167' and 169' of the two disks are proportioned and the gearing between the shafts timed so that the complete revolution of the shaft 165 will successively hold the sleeves 135, 145 in engagement with the gears 133, 134, and 143, 144 in the manner described such periods as may be required for effecting the requisite movements of the tuft inserters and the tuft gatherers.

As in a machine of the kind herein described, or in other machines for effecting a succession of similar movements, the four movements controlled by the mutilated disks 166, 166' must be repeated, as in the present illustration of the principles involved, three times, the bevel gear 163 is mounted loosely on the shaft 165 and is provided with suitable clutch teeth 163' and a pinion 170 provided with corresponding clutch teeth 170', is held slidably on the shaft 165 into engagement with the teeth 163' against the tension of a spring (not shown) on the shaft 165 bearing against the pinion 170 tending to force the same rightward and thus out of engagement with the gear 163. A suitably journaled gear wheel 172, mutilated at 171, provided with a suitable flange, preferably a disk 173 of the larger diameter secured thereto, correspondingly mutilated at 173' is held in mesh with the pinion 170, as shown in Fig. 14.

When the machine is at rest, the pinion 170 rests in the mutilations 171, 171'—see Fig. 17—and thus out of engagement with the bevel, or miter, gear 163, so that the rotation of the shaft 130 does not affect the shaft 165. Upon imparting a slight movement to the gear 172, preferably by depressing with the foot a stud 174 therein, the beveled off portion 175, in the periphery of the disk 173 at the mutilation 171', forces the pinion 170 into engagement with the bevel gear 163. The shaft 165 then begins to rotate and the pinion 170 to drive the gear 172; the flange, or the portion of the disk 173 extending above the periphery of the gear 172, holds the pinion 170 in engagement with the gear 163 until the gear 172 has made a complete revolution and again escaped into the mutilation 171' and thus become disengaged from the gear 163. The parts described are so proportioned and the gearing timed so that the disengagement of the pinion 170 from the gear 163 takes place after the machine has completed its several successive operations repeated as many times as may be required. Thus, in operating this brush machine all the operator has to do is to lock the previously bored brush blanks in position and depress the stud 174. The machine then goes on, automatically performing the several operations described and repeating the same as many times as needed, and does not stop until all the rows of cells in the blanks have been tufted and the thus made brushes ready to be removed.

From the several modifications herein shown it is obvious that still others may be made without departing from the spirit and scope of my invention. Hence, I reserve the right to make such changes and alterations as fairly fall within the spirit and scope of my invention.

In view of the constructions shown and described in the applications hereinbefore acknowledged, I claim:

1. A brush machine comprising a member containing a conduit formed so that two of its walls are parallel and the other two convergent and having knot-fastener-guiding grooves in the parallel walls.

2. A brush machine comprising a member composed of two conjoined parts having a row of conduits formed along the line of juncture of the said two parts each conduit of which is tapered widthwise of the row and has oppositely disposed grooves along the line of juncture of the said two parts.

3. A brush machine comprising a member containing a row of conduits each of which has two parallel and two convergent walls and is provided with oppositely disposed grooves in its parallel walls; means for holding a brush blank so that a row of cells therein coincides with the row of circular openings of the said conduits, and plungers the free end of each of which slides freely in the said oppositely disposed grooves in the conduit.

4. The combination, in a brush machine, of means for carrying a plurality of brush blanks the cells in which are arranged staggeringly having openings therein through which the said cells are exposed, and tuft inserters corresponding in number to that of the brushes arranged in relation to the rows of cells so that some of the inserters are in position for operation on the first rows of cells in the blanks opposite thereto, some on the second rows of cells, and so on, and upon moving the said carrying means successive rows of cells are brought into position for operation by the said inserters.

5. The combination, in a brush machine, of a member containing a plurality of conduits, a corresponding number of plungers adapted to the said conduits, and blank carrying means for carrying a corresponding number of brush blanks; the blanks being arranged in relation to the said conduits so that some of the latter are in line for tufting the first rows of cells in the blanks opposite thereto, some the second rows, and so on, so that upon moving the said carrying means successive rows of cells will be brought in line for tufting.

6. A brush machine comprising a plurality of tuft inserters arranged so as to radiate from a common center, with means for carrying a plurality of brush blanks arranged circularly held in the center of said inserters adapted to be moved so as to bring rows of cells in said blanks in line with said inserters, and means for locking said blank carrying means against movement.

7. In a brush machine, the combination of a member adapted to carry a plurality of brush blanks arranged circularly with composite means for locking the blanks in position each part of which is adapted to engage a certain number of said blanks.

8. In a brush machine, the combination of a member adapted to carry a plurality of brush blanks arranged circularly, with means for locking the blanks in position, and means for accommodating the said means to some of said blanks varying slightly in thickness.

9. The combination, in a brush machine, of a plurality of plungers arranged so as to radiate from a common center, with means for holding brush blanks arranged circularly in the center of said plungers; said means being adapted to be operated so as to bring successively rows of cells in said blanks in line with said plungers.

10. The combination, in a brush machine, of a plurality of tuft doubling and inserting mechanisms arranged so as to radiate from a common center, with rotatable means for holding brush blanks arranged circularly in the center of said mechanisms; said means being adapted to be operated so as to bring rows of cells in said blanks successively in the position to be tufted by said mechanisms.

11. The combination, in a brush machine, of a plurality of brush tufting mechanisms arranged so as to radiate from a common center, with brush blank carrying means held rotatably in the center of said mechanisms; said means carrying the blanks arranged circularly so that normally only one or two of the rows of cells in the blanks are in line with said mechanisms, and by rotating said means some of the remaining rows of cells in the blanks will be brought in the position to be tufted by said mechanisms.

12. The combination, in a brush machine, of a plurality of brush tufting mechanisms arranged so as to radiate from a common center, with an annular member held movably in the center of said mechanisms adapted to hold brush blanks, each having several rows of cells therein, arranged circularly in contiguity to its inner periphery; said member having openings in its periphery through which the cells in the blanks communicate with said mechanisms when brought in position to be tufted thereby.

13. The combination, in a brush machine, of a plurality of brush tufting mechanisms arranged so as to radiate from a common center, with an annular member held movably in the center of said mechanisms having openings in its periphery, and means within said member adapted to hold pitted brush blanks in contact with the inner wall thereof and so that each row of cells is exposed through said openings therein; the openings in said member being so arranged in relation to said mechanisms that on rotating said member the several openings exposing the cells in each of the brush blanks will be brought successively in line with said mechanisms, and means for rotating the said annular member.

14. The combination, in a brush machine, of a plurality of plunger-and-conduit tufting mechanisms arranged so as to radiate from a common center, with an annular member in the center of said mechanisms carrying pitted brush blanks, held therein in contiguity to its inner wall, and having rows of openings through its thickness each opening of which leads to a row of cells in a brush blank, but only one of the openings of said member being in line with a plunger-and-conduit mechanism; said openings in said member being so arranged in relation to said mechanisms that upon rotating said annular member a predetermined distance openings will be brought successively in line with said mechanisms.

15. The combination, in a brush machine, of a plurality of rows of plungers arranged so as to radiate from a common center, with an annular member carrying brush blanks, each of which has several rows of cells, held rotatably in the center of said plungers; said member having rows of openings therein each of which leads to a row of cells in a brush blank, and the blanks and openings being so arranged in relation to said plungers that on rotating said member predetermined distances the rows of openings therein will successively be brought in line with the rows of plungers; and means situated between said member and plungers adapted to contain the filaments for the tufts.

16. In a brush machine, the combination of two blocks held a predetermined distance apart one of which contains a conduit and the other a plunger, and a movable tuft gatherer fitting snugly in the space between the said two blocks.

17. In a brush machine, the combination of a reciprocally movable tuft inserter with a rotatable pulley and intermediate mechanism adapted to transmit the motion of said pulley to said inserter, and means for automatically rendering said mechanism inoperative at the end of travel of said inserter.

18. A brush machine comprising a composite block having a conduit therein coursing along the line of juncture of the contiguous parts of said block.

19. A brush machine comprising a composite block having a widthwisely tapering conduit therein coursing along the line of juncture of its contiguous parts.

20. A brush machine comprising a composite block having a plurality of conduits therein each of which courses along the line of juncture of contiguous parts thereof and a seat for a brush blank adapted to stay the blank so that cells therein are in line with said conduits.

21. The combination, in a brush machine, of a block having an opening therein with means in said opening for holding brush blanks in contact with its wall, and rotatable means for locking said blanks in position.

22. The combination, in a brush machine, of a plurality of tuft inserters with screw means for actuating the same and gear means for actuating the screw means.

23. The combination, in a brush machine, of a plurality of tuft inserters arranged so as to move on lines radiating from a common center, screw means for moving said inserters radially, pinions for actuating said screw means, and a circular rack for driving said pinions.

24. The combination, in a brush machine, of a table, a top thereover, brush blank supporting means, and tuft inserters movable in the space between said table and top.

25. The combination of a centrally-open cylindrical block having a plurality of seats for brush blanks in the wall of its opening in the center and conduits leading thereto, with vertically-disposed ribs in the wall of said opening, for staying the blanks in the said seats vertically.

26. The combination of a centrally-open cylindrical block having conduits coursing radially therein, with means in the said opening in the center for holding brush blanks in contact with the wall of the opening against stress to be communicated to them through the said conduits.

27. The combination of a cylindrical block having a polygonal opening therein, each of the flat surfaces of which is adapted to receive a brush blank to be operated on, and conduits leading to the cells in the brush blanks, with means within the opening for holding the blanks in contact with the flat surfaces against stress.

28. The combination of a cylindrical block having an opening therein and conduits leading thereinto, with means within the said opening for staying brush blanks, and means for holding the blanks in contact with the wall of the opening against stress.

29. The combination of a block having an opening and conduits leading thereinto, with ribs projecting into the said opening for staying brush blanks, and means within the said opening for exerting pressure on the backs of the blanks.

30. The combination of a block having an opening and conduits leading thereinto, with radially-expansible means adapted to hold brush blanks in contact with the wall of the opening against stress.

31. The combination of a block having an opening and conduits leading thereinto, with a radially-expansible toggle-joint means in the center of the opening, for holding brush blanks in contact with walls of the opening against stress.

32. The combination of male-and-female brush tufting mechanisms disposed on lines radiating from a common center, with a circular rack and an operative connection between the rack and the several male members, and means for rotating the rack.

33. The combination of a table with male and female brush tufting mechanisms mounted thereon the male members of which are held slidably on lines radiating from a common center, and means of the described or equivalent construction, for moving the several male members synchronously adapted to permit the removal of some of the male members without disturbing the adjustment of the others.

34. The combination of a table having a circumferential groove therein with male- and-female brush tufting mechanisms mounted thereon the male members of which are held slidably on lines radiating from a common center, and a circular rack for moving the several male members synchronously held rotatably in the said groove; the said groove being of a depth and the rack of a thickness as to permit removal of some of the male members without disturbing the adjustment of the others.

35. In a row-tufting mechanism, a tuft gatherer comprising a bar containing a plurality of individual conduits, and teeth on said bar each of which rises from a partition between an adjacent pair of conduits.

36. In a row tufting mechanism, a tuft gatherer composed of conjoined bars provided with a rib along the line of juncture and having spaces cut across said rib and openings in the said bar coincident with the spaces; said spaces being at a slight angle to the surface of said rib so as to form teeth leaning in one direction.

37. The combination, in a brush machine, of a member containing a plurality of parallelly disposed conduits each of which is provided with oppositely disposed grooves for conveying knot fasteners, and means at the terminals of said conduits and grooves for diverting the fasteners from their parallel course.

38. The combination, in a brush machine, of a member containing a plurality of rows of conduits, the conduits in each row of which course on lines parallel to each other and the several rows of conduits course on lines convergent to each other, and a plate, having holes therein some of which are bored at an angle to its surface, held to the narrower face of said member so that each hole forms a continuation of one of said conduits.

39. The combination, in a brush machine, of a movable brush blank carrier for carrying a plurality of brush blanks with a plurality of tuft inserters, and means for automatically moving said carrier so as to bring rows of cells in said blanks into operative relation with the several tuft inserters.

40. The combination, in a brush machine, of a movable brush blank carrier for carrying a plurality of brush blanks, a plurality of tuft inserters, a plurality of movable tuft gatherers, and means for automatically moving said blank carrier and tuft gatherers simultaneously.

41. The combination, in a brush machine, of an annular brush blank carrier, for carrying a plurality of brush blanks, held rotatably, a plurality of tuft inserters, a plurality of tuft gatherers held movable lineally in close proximity to said tuft inserters, and means for automatically rotating said carrier and moving lineally said tuft gatherers synchronously.

42. The combination, in a brush machine, of a plurality of tuft-doubling-and-inserting mechanisms arranged in the described or equivalent manner, with knot-fastener-containing receptacles each of which is provided with a push bar, and means for simultaneously actuating the several push bars.

43. The combination, in a brush machine, of a table having a slot therein with a tuft-inserter-guiding member held upon the table in close proximity to said slot therein and a filament receptacle held to the underside of said table so as to expose filaments through the slot therein, and a tuft gatherer in the said receptacle movable into contact with the said member through the slot in said table.

44. The combination, in a brush machine, of a member for guiding a row of tuft inserters with a tuft gatherer having a row of teeth held movable into close contact with the face of the said member for holding the tufts of filaments gathered in the spaces between said teeth boxed in by the face of said member.

In testimony whereof I affix my signature in presence of two witnesses.

CHARLES S. LABOFISH.

Witnesses:
PHILIP F. LARNER,
WM. H. SOMERWELL.